United States Patent [19]
Kumar et al.

[11] Patent Number: 5,918,161
[45] Date of Patent: Jun. 29, 1999

[54] METHOD AND APPARATUS FOR REDUCING MULTIPATH SIGNAL ERROR USING DECONVOLUTION

[75] Inventors: Rajendra Kumar, Cerritos; Kenneth H. Lau, Temple City, both of Calif.

[73] Assignee: The United States of America as represented by the Administrator of the National Aeronautics and Space Administration, Washington, D.C.

[21] Appl. No.: 08/786,356

[22] Filed: Jan. 16, 1997

[51] Int. Cl.⁶ .................................................. H04Q 7/20
[52] U.S. Cl. ........................... 455/65; 455/12.1; 455/427; 455/504
[58] Field of Search ................. 455/65, 12.1, 10, 455/504, 501, 427, 506

[56] References Cited

U.S. PATENT DOCUMENTS

| | | | |
|---|---|---|---|
| 5,347,536 | 9/1994 | Meehan | 445/65 |
| 5,630,208 | 5/1997 | Enge et al. | 455/65 |
| 5,771,456 | 6/1998 | Pon | 455/504 |
| 5,781,152 | 7/1998 | Renard et al. | 455/65 |

OTHER PUBLICATIONS

Adaptive Equalization Via Fast Quantized–State Methods, Written By R. Kumar IEEE Transactions of Communications, vol. Com–29, No. 10, Oct. 1981.

Blind Equalization of Digital Communication Channels Usuing High–Order Moments, Written by B.Porat, IEEE Transaction on Signal Processing. vol. 39, No. 2, Feb. 1991.

Expanding the Performance Envelope of GPS–Based Attitude Determination Written by C. E. Cohen, ION GPS, Albuquerque, NM, Sep. 9–13, 1991.

Theory and Performance of Narrow Correlator Spacing in a GPS Receiver Written by A.J. Van Dierendonck, Journal of the Institute of Navigation vol. 39, No. 3, Fall 1992.

The Multipath Estimating Delay Lock Loop: Approaching Theoretical Accuracy Limits, Written By R. Nee, 1994, IEEE.

National Technical Meeting Jan. 22–24, 1996 Paper: Deconvolution Approach to Carrier and Code Multipath Error Elimination in High–Precision GPE.

Primary Examiner—Curtis A. Kuntz
Assistant Examiner—Nay Maung
Attorney, Agent, or Firm—John H. Kusmiss

[57] ABSTRACT

A deconvolution approach to adaptive signal processing has been applied to the elimination of signal multipath errors as embodied in one preferred embodiment in a global positioning system receiver. The method and receiver of the present invention estimates then compensates for multipath effects in a comprehensive manner. Application of deconvolution, along with other adaptive identification and estimation techniques, results in completely novel GPS receiver architecture.

7 Claims, 11 Drawing Sheets

METHOD AND APPARATUS FOR REDUCING MULTIPATH SIGNAL ERROR USING DECONVOLUTION

ORIGIN OF THE INVENTION

The invention described herein was made in the performance of work under a NASA contract, and is subject to the provisions of Public Law 96-517 (35 U.S.C. § 202) in which the Contractor has elected not to retain title.

TECHNICAL FIELD

The present invention relates to signal error reduction, and more specifically to a method and apparatus for reducing Global Positioning Satellites (GPS) multipath signal error using deconvolution to determine the attitude and position of kinetic platforms.

BACKGROUND ART

The superiority of GPS receiver technology over other competing technologies, in terms of the cost, reliability, mass, size, and power considerations, as proven in its various applications such as navigation, spacecraft orbit determination, and surveying, has constantly prompted the extension of GPS to other important areas that require increasingly more exacting performance from the GPS system. One such area, for example, is the application of GPS to the attitude determination of aircraft and earth orbiting satellites.

For the GPS receivers to provide the requisite precision, the existing error sources in the GPS system must be eliminated or greatly reduced. At the current state of GPS technology, the most significant error source is the signal multipath propagation. For example, in spacecraft operational environments, the GPS signal is reflected from various structural components of the spacecraft and these reflected components are received by the GPS receiver along with the desired direct line-of-sight (LOS) path. The reflected signals differ from the desired LOS path signal in terms of their delays, amplitudes, and phases. The carrier phase tracking loop provides no inherent discrimination against the multipath signals and thus tracks the phase of the composite signal corrupted by multipath components. The resulting differential carrier phase estimation error can be orders of magnitude higher compared to the case of no multipath propagation in many GPS applications. For example,, the measurements obtained by the RADCAL satellite GPS-ADS (Attitude Determination System) experiments have shown that the differential range error in such environment is of the order of 1 cm corresponding to an attitude determination error of about 0.5 degree. Thus for the GPS receivers to provide precision pointing knowledge (order of 1 arcmin or better with 1 meter antenna baseline) or a differential range accuracy of about 0.3 mm or better, the multipath effects must be suppressed by orders of magnitudes. Similar accuracy may also be desirable in other GPS precision applications in the presence of multipath signals such as GPS based geophysical measurements and precision surveying.

Among the past approaches to deal with the multipath problem, one approach involves reducing the early-late delay spacing among the correlators in the GPS receiver code lock loop. However while this approach reduces the code range errors to some extent, it does not aid in the carrier phase measurements accuracy that is the basis of most GPS precision applications. Moreover even the reduction in the code range error is limited and if the early-late spacing is smaller than the initial delay error due to multipath signals (easily the case with many multipath situations), then the loop error can be very high and the loop may not even track.

In the work of VanNee et al., a set of nonlinear implicit equations are derived on the basis of maximum likelihood estimation theory. These equations contain the amplitude,, phase and delay of multipath signals. The paper proposes to solve these highly nonlinear equations in a recursive manner, but there is no explicit solution presented. The method has been implemented in a Nov Atel receiver using multiple correlators. Although this approach is useful for code phase measurement and a benign multipath environment, it may not be suitable for severe multipath environment and for precision GPS applications based on carrier phase measurements.

STATEMENT OF THE INVENTION

The present invention provides a method and apparatus for simultaneous estimation and compensation of the multipath estimation errors in both the carrier phase lock and the code delay lock loops in GPS receivers. The preceding is accomplished by disclosing new techniques for dealing with the multipath problem and includes these techniques in an improved GPS receiver. These techniques are based on the application of the optimal deconvolution approach in a somewhat unconventional manner, as compared to its application in other fields such as seismology and telecommunications. The proposed method consists of first estimating the impulse response of the effective multipath channel by a least squares algorithm. This step is followed by obtaining an inverse filter which equalizes the multipath channel response to the desired ideal multipath free response to the maximum extent possible within the specified constraints of the implementation complexity. From the equalized response, estimates of the true carrier phase and code delay can be made. The simulation results demonstrate that the proposed method is capable of reducing the multipath distortion by several orders of magnitude in an environment that is more severe than may possibly take place in any realistic precision GPS applications environment.

The invention also is embodied in a receiver comprising a series of correlators which generate demodulated signals from known reference signals, and the demodulated reference signals are then used to develop a discriminator function from which multipath error can be approximately determined. The present invention then compensates for the multipath error, and produces a final differential phase and code range estimate after compensating for the multipath error.

The present invention presents an optimum solution to the inherent tradeoffs among hardware/software implementation complexity, the extent of the multipath expected in the application, and the degree of multipath cancellation.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

Figure 1:
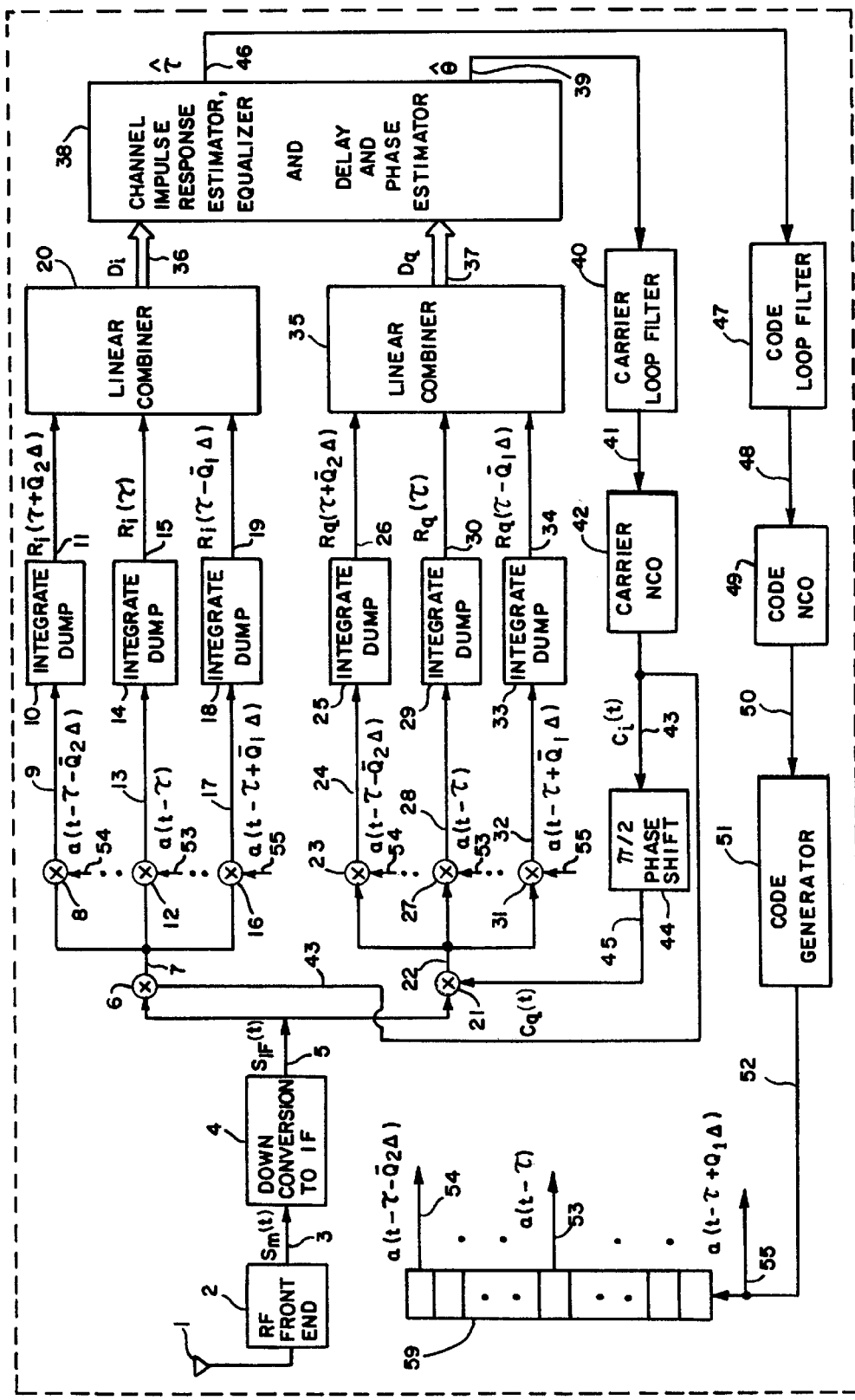
FIG. 1 is a block diagram of the elements of a receiver in a preferred embodiment of the present invention.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a method and apparatus for reducing multipath error especially in GPS applications.

In the more conventional telecommunication applications of the deconvolution approach or the equalizer theory, the multipath propagation channel is modeled as, $$y_j = \sum_{k=-q_1}^{q_2} h_k u_{j-k} + v_j \tag{1}$$

where $\{u_j\}$ represents the transmitted symbol sequence, $\{y_j\}$ is the channel output sequence, and $\{h_{-q_1}, h_{-q_1+1}, \ldots, h_0, h_1, \ldots h_{q_2}\}$ represents the discrete channel impulse response. The additive noise sequence $\{v_j\}$ is usually assumed to be a zero-mean white Gaussian. The basic process of deconvolution involves the estimation of the transmitted input sequence $\{u_k\}$ on the basis of noisy observations $\{y_k\}$ assuming that the discrete channel impulse response $\{h_k\}$ is known to the receiver. In the case of unknown channel response, adaptive equalization techniques may be used wherein first an approximate estimate of $\{h_k\}$ is obtained on the basis of a training sequence known in advance to the receiver and the channel output $\{y_k\}$ and subsequently the estimate of $\{h_k\}$ is refined adaptively with $u_k$ replaced by its estimated/detected version in the adaptive algorithm. From the real time estimate of $\{h_k\}$, a time-varying inverse filter is derived which then filters $\{y_k\}$ to obtain the estimate of $\{u_k\}$. In practice the two steps of estimating $\{h_k\}$ and then finding the corresponding inverse filter are combined into a single step of finding directly the adaptive equalizer coefficients. The problem wherein the adaptive equalization is achieved without any training sequence is relatively more difficult and has also received considerable attention in the literature.

In the following, the deconvolution approach is extended to the problem of multipath elimination in the GPS receiver code tracking and carrier phase lock loops. Referring to the drawing of GPS receiver multipath compensator 100 shown in FIG. 1, the antenna 1 receives the GPS signal which is filtered and amplified by the RF front end 2. In the absence of the multipath signals, the output 3 of the RF front end 2 is given by:

$$s(t) = A_c \cos\left[\omega_c t + a(t)\frac{\pi}{2}\right] \tag{2}$$

where the receiver noise is not considered in the first instance, $A_c$ is the received signal amplitude, $\omega_c$ is the GPS signal frequency, and $a(t)=\pm 1$ is the pseudo-random code waveform that phase modulates the carrier. It is assumed that the data modulation is removed in a decision-directed manner. In the presence of N multipaths in addition to the direct line-of-sight path, the input signal may be characterized as $$s_m(t) = s(t) + \alpha_1 s(t-\tau_1) + \ldots + \alpha_N s(t-\tau_N) \tag{3}$$

where $\alpha_i$ and $\tau_i$ denote respectively the amplitude and delay of the i th multipath for i=1,2, . . . ,N, and s(t) is the direct path or line-of-sight component of $s_m(t)$. After substituting (2) in (3), the composite received signal may be expressed as follows:

$$s_m(t) = A_c \cos\left(\omega_c t + a(t)\frac{\pi}{2}\right) + \alpha_1 A_c \cos\left(\omega_c t + \frac{\pi}{2}a(t-\tau_1) + \theta_{m_1}\right) + \ldots + \alpha_N A_c \cos\left(\omega_c t + \frac{\pi}{2}a(t-\tau_N) + \theta_{m_N}\right); \theta_{m_i} = -\omega_c \tau_i \tag{4}$$

This signal $s_m(t)$ is translated from the carrier frequency to an intermediate frequency (IF) by converter 4 to yield IF signal $s_{IF}(t)$ at an intermediate frequency $\omega_1$. Thus, equation (4) can then be represented as $$s_m(t) = A_c \cos\left(\omega_1 t + a(t)\frac{\pi}{2}\right) + \alpha_1 A_c \cos\left(\omega_1 t + \frac{\pi}{2}a(t-\tau_1) + \theta_{m_1}\right) + \ldots + \alpha_N A_c \cos\left(\omega_1 t + \frac{\pi}{2}a(t-\tau_N) + \theta_{m_N}\right); \theta_{m_i} = -\omega_c \tau_i. \tag{5}$$

In the conventional delay-lock discriminator the signal in (5) is correlated with the reference signals $$s_L(t) = 2\cos\left(\omega_1 t + a(t-\tau-\tau_d)\frac{\pi}{2} + \theta_c\right) \tag{6}$$

$$s_E(t) = 2\cos\left(\omega_1 t + a(t-\tau+\tau_d)\frac{\pi}{2} + \theta_c\right)$$

where t is the delay tracking error, $\tau_d$ is the offset delay referred to as early and late correlator delay and $\theta_c$ is the reference oscillator phase. The resulting correlation functions are given by $$\overline{s_{IF}(t) \cdot s_L(t)} = a_c \overline{\alpha(t) \cdot \alpha(t-\tau-\tau_d)} \cos(\theta_{m_0} - \theta_C) + \ldots + A_c \alpha_N \overline{\alpha(t-\tau_N) \cdot \alpha(t-\tau-\tau_d)} \cos(\theta_{m_N} - \theta_C). \tag{7}$$

The resulting signal denoted by $R_{1r}(t)$ may be written in the form below.

$$R_{1r}(\tau) = h_0 R_c(\tau+\tau_d) + h_1 R_c(\tau+\tau_d-\tau_1) + \ldots + h_N R_c(\tau+\tau_d-\tau_N) h_{ki} = \alpha_k A_c \cos(\theta_{m_k} - \theta_c); k=0,1,\ldots,N \tag{8}$$

In equation (8) $R_c(\tau)$ represents the code autocorrelation function and $\alpha_0=1$. Similarly the corresponding signal obtained with $s_L$ replaced by $S_E$ in (7) and denoted by $R_{2i}(t)$ may be written in the following form.

$$R_{2i}(\tau)=h_0 R_c(\tau-\tau_d)+h_{1i}R_c(\tau-\tau_d-\tau_1)+\ldots+h_{Ni}R_c(\tau-\tau_d-\tau_N) \quad (9)$$

The difference between $R_{1i}$ and $R_{2i}$, the so called discriminator function $D_i(\tau)$ is now given by $$D_i(\tau)=h_{0i}g_c(\tau)+h_{1i}g_c(\tau-\tau_1)+\ldots+h_{Ni}g_c(\tau-\tau_N) \quad (10)$$

where $$g_c(\tau)=R_c(\tau+\tau)-R_c(\tau-\tau_d$$

is the discriminator function in the ideal case. Clearly if $\alpha_k=0$ for all $k\neq 0$ then $D_i(\tau)=g_c(\tau)$ corresponding to the case of no multipath propagation. The standard delay lock loop converges to the solution $\tau_m$ of the equation $D_i(\tau)=0$ instead of converging to 0 which is the solution of $g_c(\tau)=0$. The multipath error $\tau_m$ can be excessive depending upon the actual multipath environment encountered as will be illustrated by several simulation examples.

In the approach of the present invention the discriminator function is measured first and then with equation (10) is used to estimate all the unknown variables including the multipath delays, amplitudes, and phases and the estimates of the multipath errors both in the phase lock and code lock loops via deconvolution. The multipath errors are then compensated for in arriving at the final differential phase and code range estimates.

To accomplish these objectives, multiple correlators corresponding to multiple values of $\tau_d$ are used in the present invention instead of just two correlators. Returning to FIG. 1, signal 5 is correlated with carrier signal 43 $C_i(t)$ in correlator 6, and the output 7 is correlated in correlators 8,12,16 with signals 54, 53, and 55, respectively. The outputs 9,13, and 17 are received by integrate/dump units 10, 14, and 18 and each output is integrated over T seconds to generate the correlator functions represented in equation (8). In the same manner, all the correlator functions $R_i(\tau+i\Delta)$ for all integers i in the range of $-\overline{Q_1}$ to $\overline{Q_2}$ are generated using additional correlators and integrate/dump units. Output 11, $R_i(\tau+\overline{Q_2}\Delta)$ is the same as $R_{1i}(\tau)$ of equation (8) with $\tau_d$ in (8) replaced by $\overline{Q_2}$ and the carrier signal 43 $C_i(t)$ is given by $$C_i(t)=2\cos(\omega_1 t+\theta_c). \quad (11)$$

The multipath resolution parameter $\Delta$ is selected sufficiently small to provide the required multipath resolution and the number of correlators $(\overline{Q_1}+\overline{Q_2}+1)$ is dependent on the extent of multipath delay spread and $\Delta$. The linear combiner 20 receives output 11, 15, and 19 from the respective integrate/dump units 10,14, and 18, as well as any other integrate/dump units (not shown) and generates the sampled values of the function $D_i(\tau)$ given in (10) by differencing pairs of its input, that is, $$D_i(\tau+k\Delta)=R_i(\tau+(k+I_d)\Delta)-R_i(\tau+(k-I_d)\Delta); k=-M_i,\ldots, 0,\ldots,M_2. \quad (12)$$

where $\tau_d$ is selected equal to $I_d\Delta$ for some integer $I_d$ and $M_1$ and $M_2$ values are dictated by the extent of multipath. Thus, in terms of $M_1$ and $M_2$, the $\overline{Q_1}$ and $\overline{Q_2}$ are given by $\overline{Q_1}=M_1+I_d$, $\overline{Q_2}=M_2+I_d$. The output 36 from the linear combiner 20 $D_i$ is the $(M_1+M_2+1)$ vector whose k th component is given by $D_i(\tau+k\Delta)$ in (12).

The signal 5, $S_{IF}(t)$ is correlated in 21 with the carrier signal $C_q(t)$ 45 which is the quadrature phase version of $C_i(t)$ and is given by:

$$C_q(t)=-1\sin(\omega_1 t+\theta_c) \quad (13)$$

Correlating output 22 of the correlator 21 with signal $a(t-\tau)$ in correlator 27 and integrating the output 28 over an interval of T seconds in the integrate/dump unit 29 generates $R_q(\tau)$ which is related to the parameters of interest by equation (14) as $$R_q(\tau)=h_{0q}R_c(\tau)+h_{1q}R_c(\tau-\tau_1)+\ldots+h_{Nq}R_c(\tau-\tau_N) \quad h_{kq}=\alpha_k A_c \sin(\theta_{m_k}-\theta_c); k=0,1,\ldots,N \quad (14)$$

In the same manner all of the correlator functions $R_q(\tau+i\Delta)$ for all integers i in the range of $-\overline{Q_1}$ to $\overline{Q_2}$ are generated using additional correlators exemplified by 23,31 and whose outputs 24,32 are received by integrate/dump units 25,33 as shown in FIG. 1. Outputs 26,30,34 are transferred to the linear combiner 35 which generates $(M_1+M_2+1)$ vector $D_q$ whose k th component $D_q(\tau+k\Delta)$ is given by:

$$D_q(\tau+k\Delta)=R_q(\tau+(k+I_d)\Delta)-R_q(\tau+(k-I_d)\Delta; k=-M_1,\ldots, 0,\ldots,M_2. \quad (15)$$

From equation (15) it follows that $D_q(\tau)$ may be expressed as:

$$D_q(\tau)=h_{0q}g_c(\tau)+h_{1q}g_c(\tau-\tau_i)+\ldots+h_{Nq}g_c(\tau-\tau_N). \quad (16)$$

For the purpose of estimating and filtering, the outputs 36 and 37 are combined into the vector D given by $$D=D_i+jD_q \quad (17)$$

where $j=\sqrt{-1}$ and the k th component of D denoted by $D^k$ is given by $$D^k=D(\tau+k\Delta)=D_i(\tau+k\Delta)+jD_q(\tau+k\Delta) \quad (18)$$

From equations (10), (16), and (18) it follows that $$D(\tau)=h_0g_c(\tau)+h_1g_c(\tau-\tau_1)+\ldots+h_Ng_c(\tau-\tau_N)+n(\tau) \quad h_k=h_{ki}+jh_{kq}; k=1,\ldots,N. \quad (19)$$

Here, $D(\tau k)$ is the complex-valued discriminator function, and $n(t)$ represents the noise at the correlator output corresponding to the noise at the receiver input.

Figure 2:
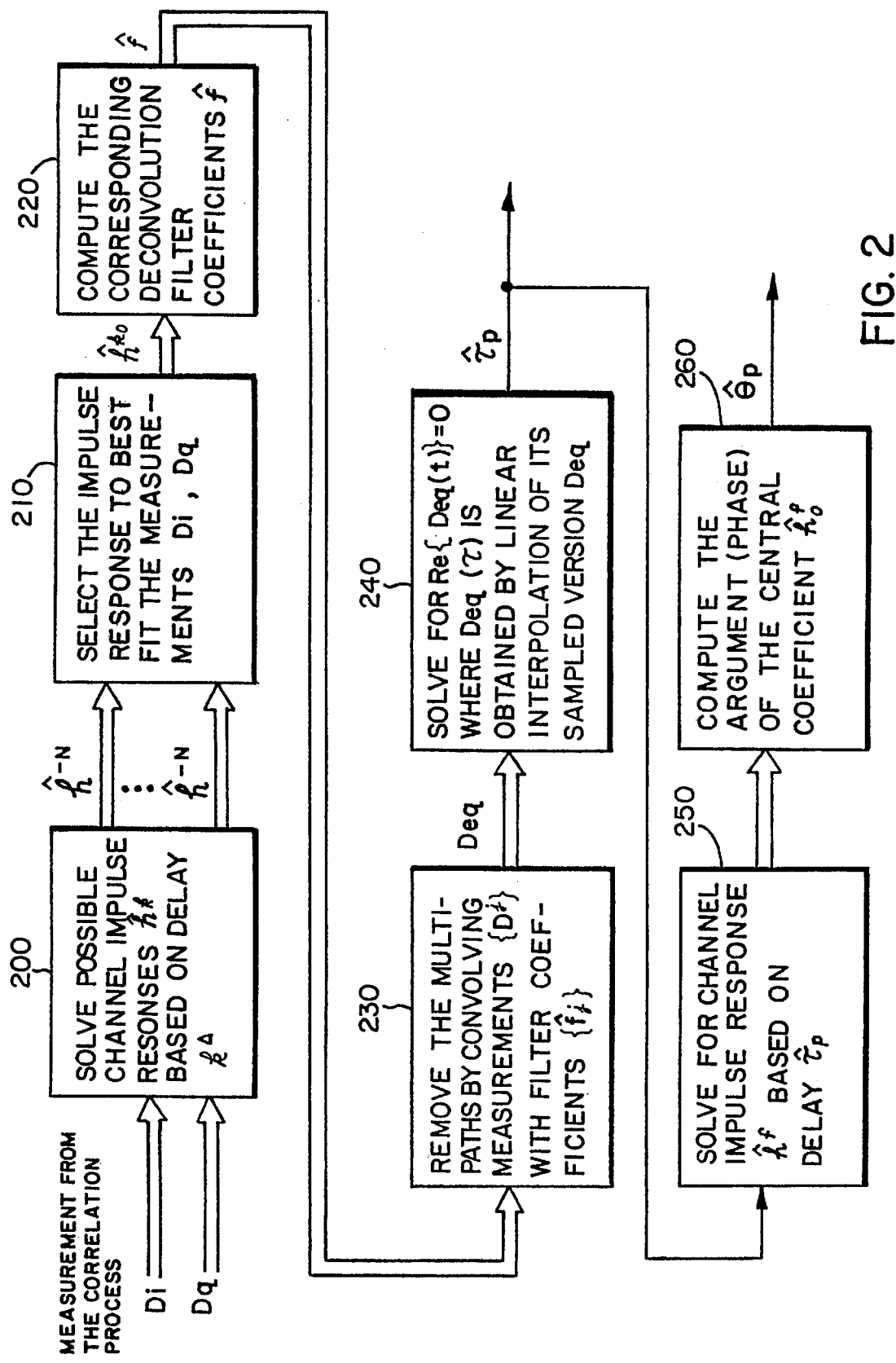
FIG. 2 is a flow diagram of the channel impulse response estimator and equalizer of FIG. 1.

FIG. 2 illustrates a flow chart of the steps executed by the channel impulse response estimator and equalizer 38. Step 200 involves obtaining the two discriminator functions $D_i$ and $D_q$ from the linear combiners 20,35 and solves for possible channel impulse responses $\hat{h}^k$ based on delay $k\Delta$. The output from step 200 is a series of channel impulse responses $\hat{h}^{-N}$ through $\hat{h}^N$, which are then processed in step 210. Step 210 selects the impulse response which best fits the measurement for the inputs $D_i$ and $D_q$, denoted as $\hat{h}^{k_0}$. In step 220, the corresponding deconvolution filter coefficients $\hat{f}$ are computed from the results of step 210, and the coefficients are used in step 230 to remove the multipath contribution by convolving measurements $\{D^j\}$ with $\{\hat{f}_j\}$. The resultant discriminator function $D_{eq}$ is then solved in step 240 for $Re\{D_{eq}(\tau)\}=0$ by linear interpolation of the sampled version of $D_{eq}$. The delay obtained, $\tau$ is used in step 250 to solve for the channel impulse response $\hat{h}^f$ and to compute the argument (phase) of the central coefficient $\hat{h}_0^f$ in the final step 260.

Turning to the preferred solution, in FIG. 1 estimator 38 processes the input vectors $D_i$ and $D_q$ to estimate the multipath channel impulse response, obtain the coefficients of a deconvolution filter, and from these derive an estimate of the delay $\tau$ and the phase difference $\theta=(\theta_{m0}-\theta_C)$ such that these estimates are not corrupted by the multipath signals. For an understanding of the estimator 38, Equation (19) is rewritten in its discrete form (20), that is, substitute $\tau=j\Delta$ where j is an integer into equation (19):

$$y_j = \sum_{k=-q_1}^{q_2} \bar{h}_k \bar{g}_{j-k} + \bar{n}_j; \quad j = -M_1, \ldots, 0, \ldots M_2 \quad (20)$$

Here $y_j=D(j\Delta)$; $\bar{g}_j=g_c(j\Delta)$; $\bar{n}_j=n(j\Delta)$; and $(-M_1,M_2)$ represents the interval over which the measured discriminator function is significant. Note that equation (20) is of somewhat more general form than (19) in that this form may also include negative values of the multipath delays. The delays $\tau_1, \ldots, \tau_N$ are approximated by integer multiples of $\Delta$ which can be achieved by selecting $\Delta$ sufficiently small. A least squares estimation technique is now applied to estimate the channel impulse response coefficients $\{\bar{h}_k\}$ and the corresponding deconvolution or equalizer filter coefficients from $\{y_j\}$. Letting $$h^T = [\bar{h}_{-q_1}, \ldots, \bar{h}_{-1}, \bar{h}_0, \bar{h}_1, \ldots, \bar{h}_{q_2}]$$

$$g_j^H = [\bar{g}_{j+q_1}, \ldots, \bar{g}_{j+1}, \bar{g}_j, \bar{g}_{j-1}, \ldots, \bar{g}_{j-q_2}]; \quad j=-M_1, \ldots, 0, \ldots, M_2$$

the least squares estimate of the unknown channel impulse response vector is given by $$\hat{h} = \left( \sum_{j=-M_1}^{M_2} g_j g_j^H + \sigma_n^2 I \right)^{-1} \sum_{j=-M_1}^{M_2} g_j y_j \quad (21)$$

where $\sigma_n^2 = E[\bar{n}_j^2]$ and I is the identity matrix. Now denoting by $\chi_0$ the truncated (or zero padded depending upon whether $q_i > K_i$ or vice versa; i=1,2) version of $\hat{h}$, i.e., with $$\chi_0 = [\hat{h}_{K_1}, \ldots, \hat{h}_0, \ldots \hat{h}_{-K_2}]$$

where $K_1$ and $K_2$ are the selected numbers of the deconvolution filter coefficients, and by $\chi_j$ the j times shifted version of $\chi_0$, $$X_j = [\hat{h}_{K_1+j}, \ldots, \hat{h}_j, \ldots, \hat{h}_{-K_2+j}]$$

the optimum parameter vector $\hat{f}$ is given by $$\hat{f} = \left( \sum_{j=-(K_1+q_1)}^{(K_2+q_2)} \chi_j \chi_j^H + \frac{\sigma_n^2}{\kappa} I \right)^{-1} \chi_0 \quad (22)$$

Note that in the definition of $\chi_j$ the entries for $\hat{h}_j$ are set equal to zero if j falls outside the interval $[-q_1,q_2]$. Also the constant $\kappa$ is given by $$\kappa = \frac{1}{L} \sum_{j=-L_1}^{L_2} \bar{g}_j^2; \quad L = L_1 + L_2 + 1$$

$$L_1 = M_1 + q_1; \quad L_2 = M_2 + q_2.$$

The equalized channel response z is obtained by convolving the two sequences $\{\bar{h}_{-q_1}, \ldots, \bar{h}_0, \ldots, \bar{h}_{q_2}\}$ and $\{\hat{f}_{-K_1}, \ldots, \hat{f}_0, \ldots, \hat{f}_{K_2}\}$. The elements of z are denoted by $\{Z_{-(q_1+K_1)}, \ldots, Z_0, \ldots, Z_{(q_2+K_2)}\}$. Therefore the equalized discriminator response obtained by convolving $\{y_j\}$ with $\{\hat{f}_j\}$ sequence is given by $$D_{eq}(\tau) = \sum_{i=-(q_1+K_1)}^{(q_2+K_2)} z_i g_c(\tau - i\Delta) \quad (23)$$

For the case of perfect equalization $z_0=1$, $z_i=0$ for $i \neq 0$ and $D_{eq}(\tau)=g_c(\tau)$. In practice $Re\{D_{eq}(\tau)\} \approx g_c(\tau)$ and the solution of the equation $$Re\{D_{eq}(\tau)\}=0 \quad (24)$$

is the estimate of the delay $\tau$. When the initial delay uncertainty $\tau$ is smaller compared to $\Delta/2$ in magnitude, the j th components of the vector $D_i$ and $D_q$ at the input of 38 are approximately equal to the required real and imaginary parts of $y_j$ in equation (20), and thus the deconvolution of the multipath channel is achieved by replacing $y_j$ by the j th component of the vector $D \equiv D_i + \sqrt{-1} D_q$.

Delay Estimation

When the initial delay uncertainty $\tau$ is not small compared with $\Delta$, it is explicitly taken into account by the estimator 38. Denoting the initial uncertainty by $\tau_\epsilon - \tau_\rho$, the equation (19) is modified by replacing $\tau$ by $(\tau_\epsilon - \tau_\rho)$, yielding $$D(\tau)=h_0 g_c(\tau_\epsilon-\tau_\rho)+h_1 g_c(\tau_\epsilon-\tau_1-\tau_\rho)+ \ldots +h_N g_c(\tau_\epsilon-\tau_N-\tau_\rho)+n(\tau). \quad (25)$$

In (25) $\tau_\rho$ represents the negative of the signed integer part of $(\tau/\Delta)$ and $\tau_\epsilon$ is the fractional part of $(\tau/\Delta)$ such that $$\tau=\tau_\epsilon-\tau_\rho=\tau_\epsilon-k_0\Delta; \quad |\tau_\epsilon|<\Delta/2$$

for some signed integer $k_0$ and with D selected above. The equation (25) may be rewritten as $$D(\tau)=h_0 g_{k_0}(\tau_\epsilon)+h_1 g_{k_0}(\tau_\epsilon-\tau_1)+ \ldots +h_N g_{k_0}(\tau_\epsilon-\tau_N)+n(\tau) \quad g_{k_0}(\tau_\epsilon)= g_c(\tau_\epsilon-k_0\Delta) \quad (26)$$

Assuming that $|k_0|<N$ for some integer N, then $k_0$ is the integer k that minimizes the following index $$\min_{-N \leq k \leq N} \left\| D(\tau) - (\hat{h}^k)^T g^k(\tau) \right\|^2 = \quad (27)$$

$$\min_{-N \leq k \leq N} \int_{\tau=-(k_0+1)\Delta}^{(k_0+1)\Delta} \left\| D(\tau) - (\hat{h}^k)^T g^k(\tau) \right\|^2 d\tau$$

where $\hat{h}^k$ is the channel response obtained on the basis of replacing $k_0$ by k in (26), $$g^k(\tau)=[g_k(\tau_\epsilon), g_k(\tau_\epsilon-\tau_1), \ldots, g_k(\tau_\epsilon-\tau_N)]^T \quad (28)$$

and $g_k(\tau_\epsilon)$ is approximated by $g_c(-k\Delta)$. In the estimation of $\hat{h}^k$ for any integer k, the discretization and estimation procedure of (20)–(22) is followed. Thus the estimator 38 minimizes the following index $$\min_{-N \leq k \leq N} \sum_{j=-M1}^{M2} \left| D^j - (\hat{h}^k)^T \bar{g}_j^k \right|^2 \quad (29)$$

where $\bar{g}_0^k$ is the vector of dimension $(q_1+q_2+1)$ whose lth component is equal to $g_c(-(l+k)\Delta)$, $\bar{g}_j^k$ is equal to the j time shifted version of $\bar{g}^k$, and $\hat{h}^k$ is the solution of equation (21) with $g_j$ replaced $\bar{g}_j^k$.

If $\hat{k}_0$ is the solution of the minimization in (29), then the overall channel estimate is given by $\hat{h}=\hat{h}^{k_0}$. Substitution of $\hat{h}$ in (22) provides the coefficients of the inverse filter and the solution of (24) yields $\hat{\tau}$, signal 46 in FIG. 1. Note that if it is known that the multipath error $\tau$ is smaller than $\Delta/2$ in magnitude, then this additional procedure is not necessary. However for $k_0 > 0$, considerable error can otherwise ensue in the estimate of h.

Multipath Phase Estimation

With $\hat{\tau}$ denoting the estimate of the multipath delay error, one now solves equation (20) for h but with $\bar{g}_j$ equal to $g_c(j\Delta - \hat{\tau})$ by least squares estimation procedure. Denoting the resulting least squares solution by $\hat{h}^f$, then the multipath phase error estimate is given by the argument of the zeroth component of the estimated impulse response, i.e., $\hat{\theta} = +\arg(\hat{h}_0^f)$ which corresponds to signal 39 in FIG. 1. This error is compensated from the carrier phase-lock loop phase estimate in the following estimation cycle.

Output 39 of estimator 38 is input to a loop filter 40, which may be a digital filter similar to the ones used in phase-locked loops. In its simple form it is a multiplier by a gain $(1/G_c T)$ where is $G_c$ the sensitivity of the numerically controlled oscillator (NCO) 42. Output 41 of the carrier loop filter 40 controls the phase of the carrier signal 43 ($C_i(t)$) at the output of NCO 42. Signal 43 is inputted into phase shifter 44 which generates a $\pi/2$ phase shifted signal 45 ($C_q(t)$). Output 46 of estimator 38 is input to a code loop filter 47, which may be a digital filter similar to the ones used in delay lock loops or phase lock loops. In its simple form it is a multiplier by a gain $(1/G_d T)$ where $G_d$ is the sensitivity of the NCO 49. Output 48 of the code loop filter 47 controls the phase (delay) of the output 50 of the code NCO 49. The output of code NCO is inputted to a code generator 51 whose output is the reference code $a(t - \hat{\tau} + \overline{Q}_1 \Delta)$ which is the binary pseudo random code and is the delayed version of the code $a(t)$ appearing in the received signal 3 ($S_m(t)$).

The delay $\hat{\tau}$ of this code is controlled by signal 48 at the input of code NCO 49. The code delay signal 52 is inputted to a tapped delay line 59 implemented by a shift register (not shown). The $(\overline{Q}_1 + \overline{Q}_2 + 1)$ outputs of this tapped delay exemplified by 52, 53, and 54 are input to various correlators such as 8, 12, and 16, and to the correlators 23, 27, and 31.

In the close-loop estimator, $\hat{\tau}$ is the estimate of the delay error $\tau$ between the code phase of the direct component of the incoming signal 5 and the phase of locally generated signal 53 at one sampling time instance earlier. This error is corrected via the signal 48 at the input to the code NCO 49. With the recursive procedure in the limit the error $\tau$ will approach zero and the code signal 53 will achieve lock with the direct path component of the incoming signal, thus eliminating the effect of multipath signal components present in signal 5.

Similarly, $\hat{\theta}$ is the estimate of the phase error between the phase of the direct path component of the incoming signal 5 and the local reference signal 43 ($C_i(t)$), and by generating signal 41 via lock loop filter 40, the control of the phase of carrier NCO 42 is such as to drive this error to zero. With the recursive procedure the carrier NCO output signal 43 will achieve phase lock with the direct path component of the incoming signal, thus eliminating the effect of the multipath signal components on the carrier phase tracking. The accumulated value of signal 41 multiplied by $G_c T$ or the accumulated value of signal 39 when the carrier loop filter 40 is a multiplier with gain $(1/G_c T)$, is the estimate of the difference between the phase of the incoming signal direct path component and the initial carrier NCO signal phase. The value of signal 46 when the code loop filter is a multiplier with gain $(1/G_d T)$, is the estimate of the delay between the code phase of the incoming signal direct path component and the initial code phase of the code NCO output 50.

For the case of GPS signals, this delay difference multiplied by the velocity of light is equal to the multipath error free estimate of the code phase range. Similarly the carrier phase difference multiplied by $(\lambda/2\pi)$ where $\lambda$ is the carrier signal wavelength, is equal to the multipath error free estimate of the carrier phase range, also known as the accumulated delta range.

SIMULATION RESULTS

In this section some simulation examples are presented depicting the performance of the proposed multipath cancellation algorithm. First some additional notations are introduced to present these results. Let T and $T_c$ denote the sampling period for the signal processing system and the code chip period respectively. Also let $\bar{\tau}_d$ denote the normalized delay $\tau_d/T_c$ and g be the sample signal-to-noise power ratio given by $\gamma = (P_c T/N_0)$ where $P_c = A_c^2/2$ is the signal power received by the direct or line-of-sight path and $N_0$ is the one-sided power spectral density of the receiver thermal noise. Further denote by a and $\theta_m$ the vectors consisting of the amplitudes and phases of the discrete channel response h in equation (26). One motivation behind this invention has been the GPS application to precision attitude determination of LEO (low earth orbit) spacecrafts. Therefore the achievable carrier phase estimation errors are interpreted in terms of the equivalent attitude pointing errors. It may be easily seen that for 1 meter antenna baseline the conversion factor between the carrier phase error in radians and the corresponding pointing error in arcmin is approximately equal to 109.4. Several simulation examples are presented below in terms of the notations introduced in this section. Recall that $(q_1 + q_2)$ is equal to the number of discrete multipaths, $(K_1 + K_2 + 1)$ is the number of filter taps and g is the sample SNR.

Example 1

$q_1 = 0$; $q_2 = 8$; $K_1 = 12$; $K_2 = 4$; $\gamma = 10^3$; $\bar{\tau}_d = 0.5$
a = [1 0.2 0.5 0.8 0.9 0.7 1 0.2 0.9]
$\theta_m$ = [8 0 −0.5 0.7 1.2 0.8 −0.6 1.3 0.2 −1.1]

Figure 3:
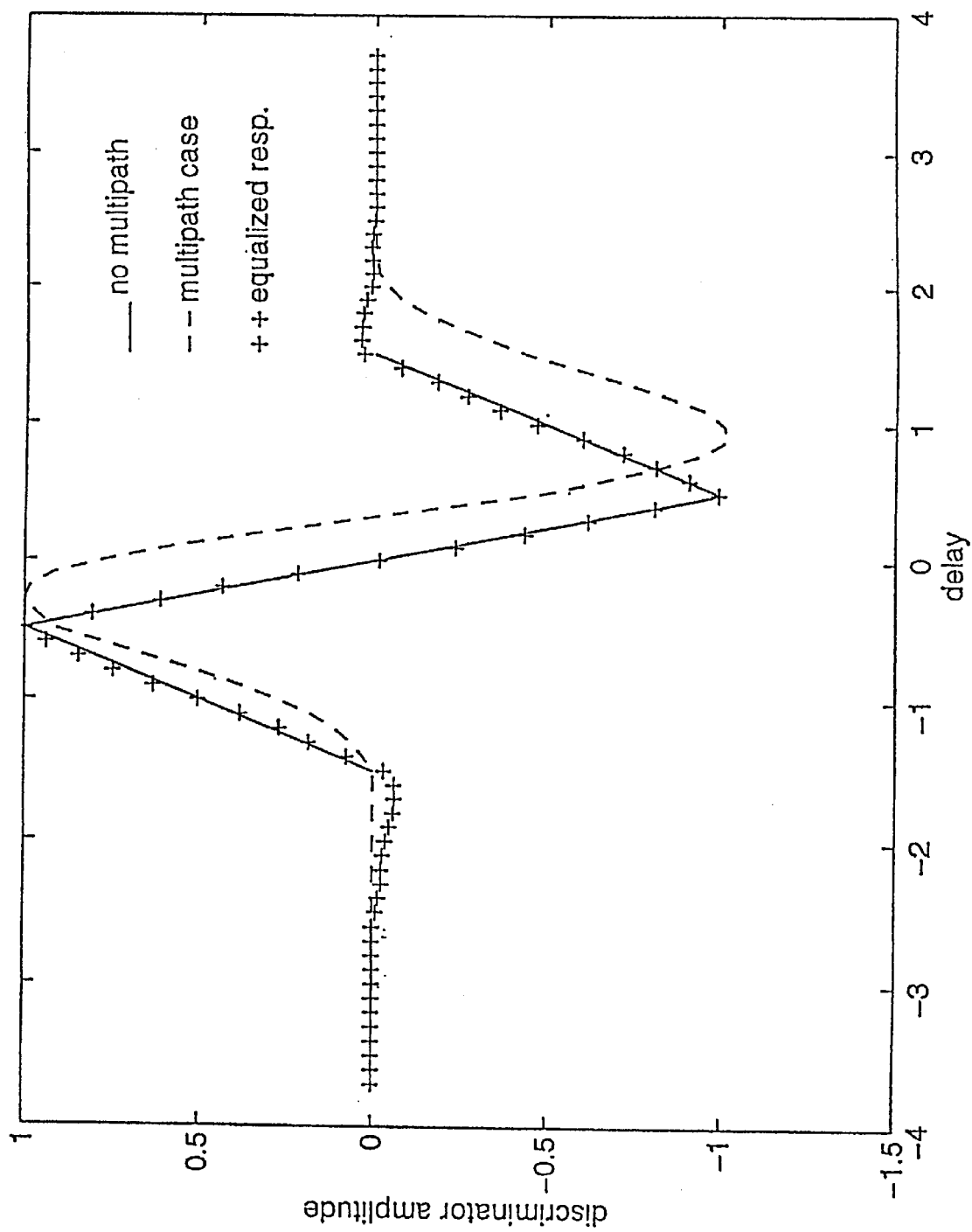
FIG. 3 is a graph illustrating the tracking of the Discriminator Function amplitude vs. delay in simulation example 1.
Figure 4:
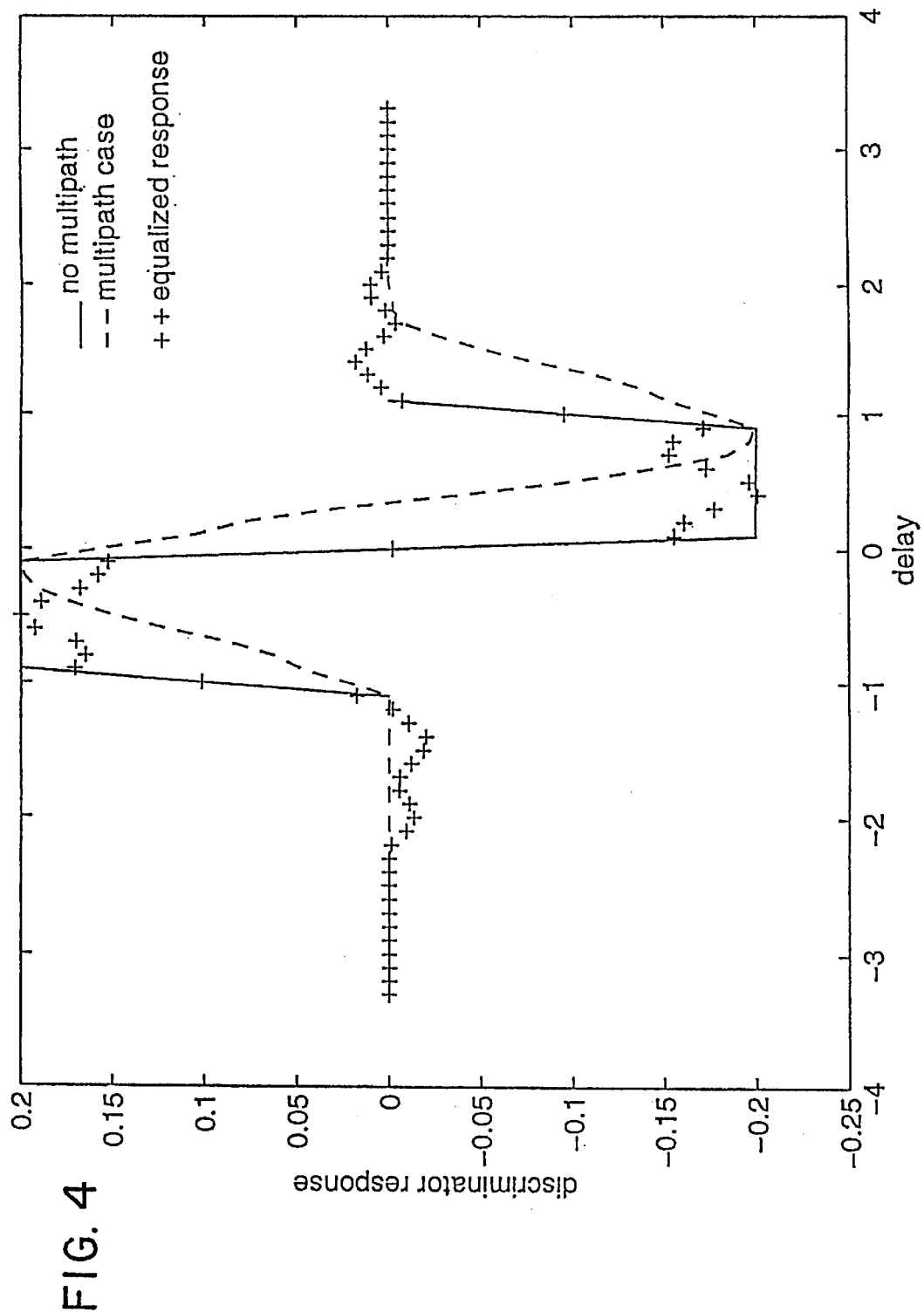
FIG. 4 is a graph illustrating the Discriminator response vs. delay in simulation example 1.
Figure 5:
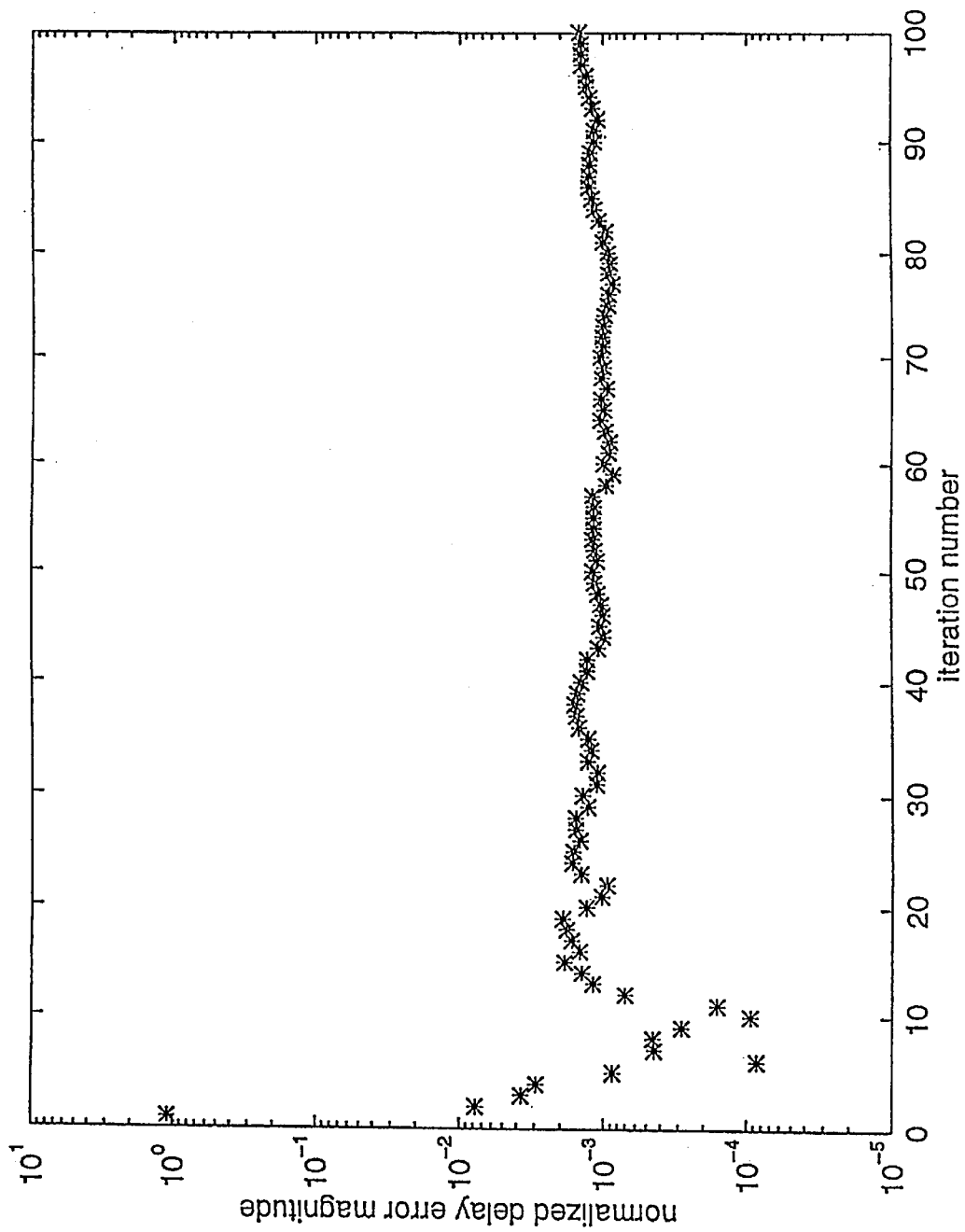
FIG. 5 is a graph of the normalized delay error magnitude vs. iterations for simulation example 1.

FIG. 3 plots the ideal discriminator response $g_c(\tau)$, distorted response D(t) of (19), and the discrete version of the equalized response $D_{eq}(\tau)$. Clearly while the zero-crossing of D(t) is about 0.4 $T_c$, the zero-crossings of both $g_c(\tau)$ and $D_{eq}(\tau)$ are equal to zero. Reducing the tap spacing to $\bar{\tau}_d = 0.1$ does not make any significant difference in the zero-crossing of the function D(t) as shown in FIG. 4, which plots the various discriminator functions for the case of $\bar{\tau}_d = 0.1$. FIG. 5 shows the convergence of the delay error as a function of the number of samples processed with an initial normalized delay of −0.498 chips.

Figure 6:
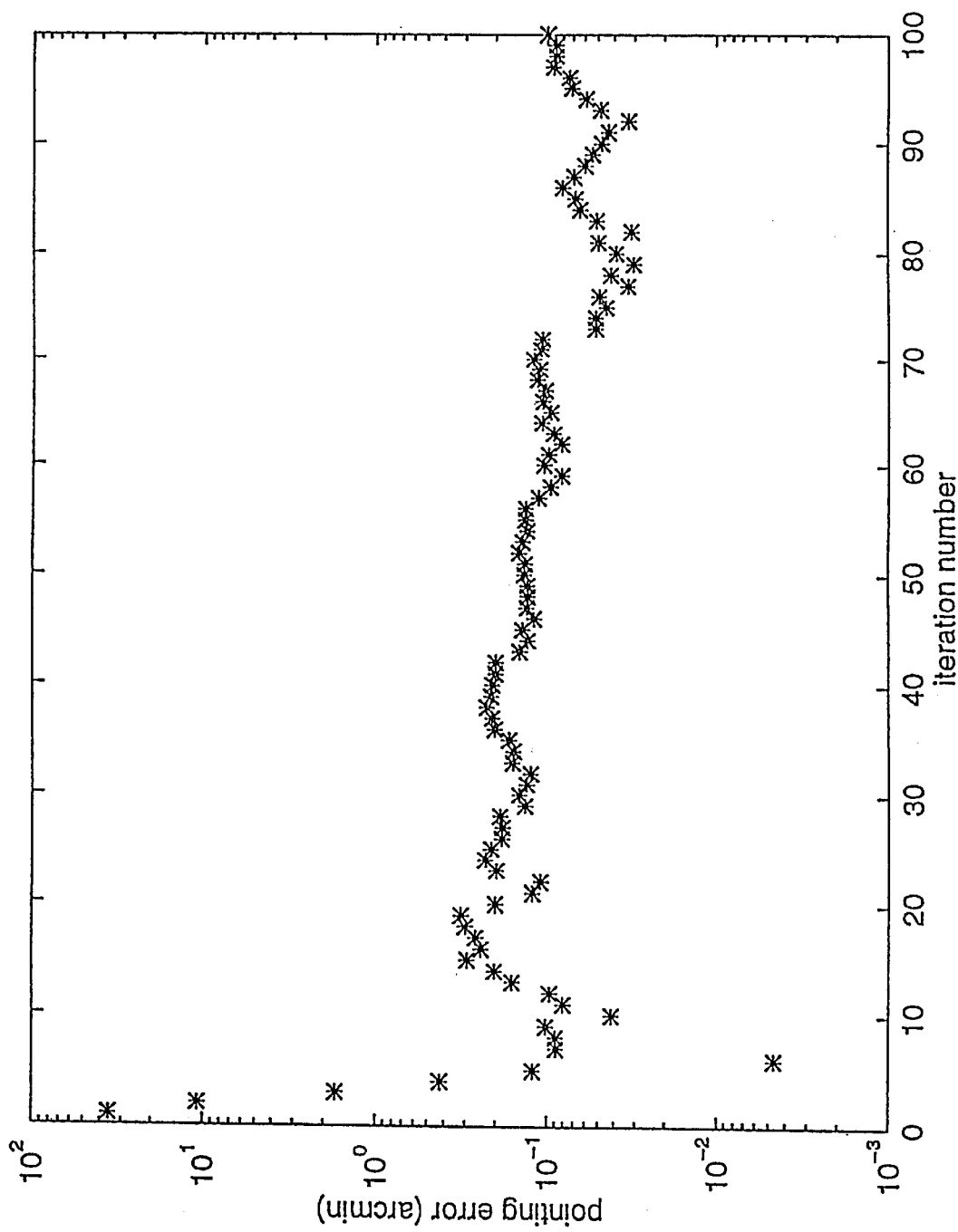
FIG. 6 is a graph of the pointing error vs. iterations for simulation example 1.

It can be seen that the steady state error without multipath correction will remain approximately equal to 0.4 $T_c$ while with the correction algorithm the error is approximately equal to 0.001 $T_c$. Note also that with a 50 dB-Hz CNR at the receiver input this period of 100 iterations corresponds to only 1 sec of real time as per the definition of g. FIG. 6 shows the carrier phase error expressed in arcmin for the GPS attitude determination application. Note that the initial error of more than 30 arcmin is reduced to about 0.1 arcmin.

Example 2

$q_1 = 0$; $q_2 = 25$; $K_1 = 35$; $K_2 = 4$; $\gamma = 10^4$; $\bar{\tau}_d = 0.1$
a = [1 0.8 0.5 0.3 0.9 0.2 0.5 0.3 0.7 0.1 0.05 0 0.08 0.1 0.03 0.02 0.1 0.07 0.05 0.04 0.1 0 0.05 0.08 0.01]
$\theta_m$ = [0 0.5 0.7 −0.7 1 0.3 0.5 −0.6 1.5 1 0.8 0.2 0.1 0 1 −0.5 −0.3 0.6 0.1 0.5 −0.8 −0.5 0.9 1.2 −0.6 1]

Figure 7:
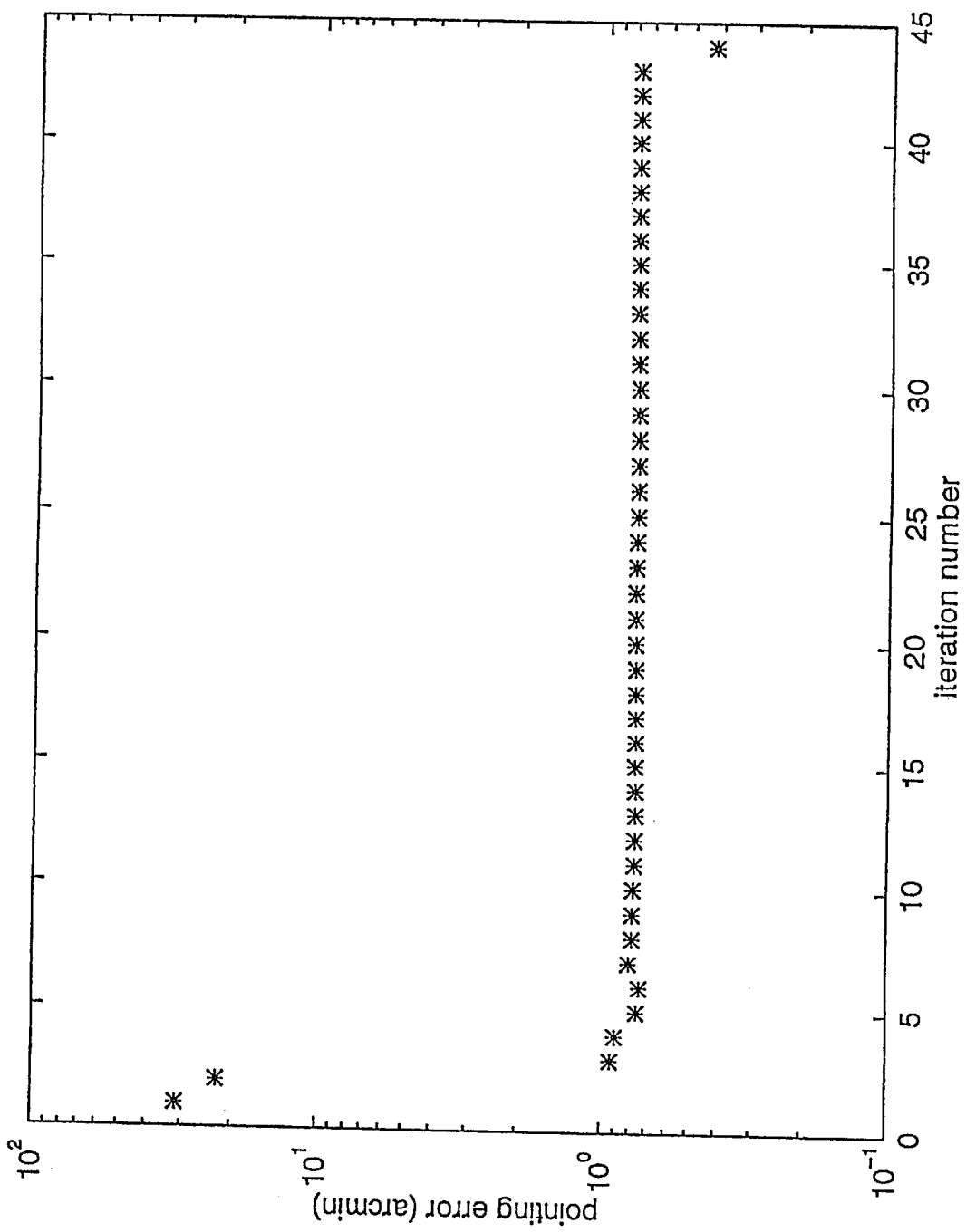
FIG. 7 is a graph of the pointing error vs. iterations for simulation example 1 with Delay>0.9.
Figure 8:
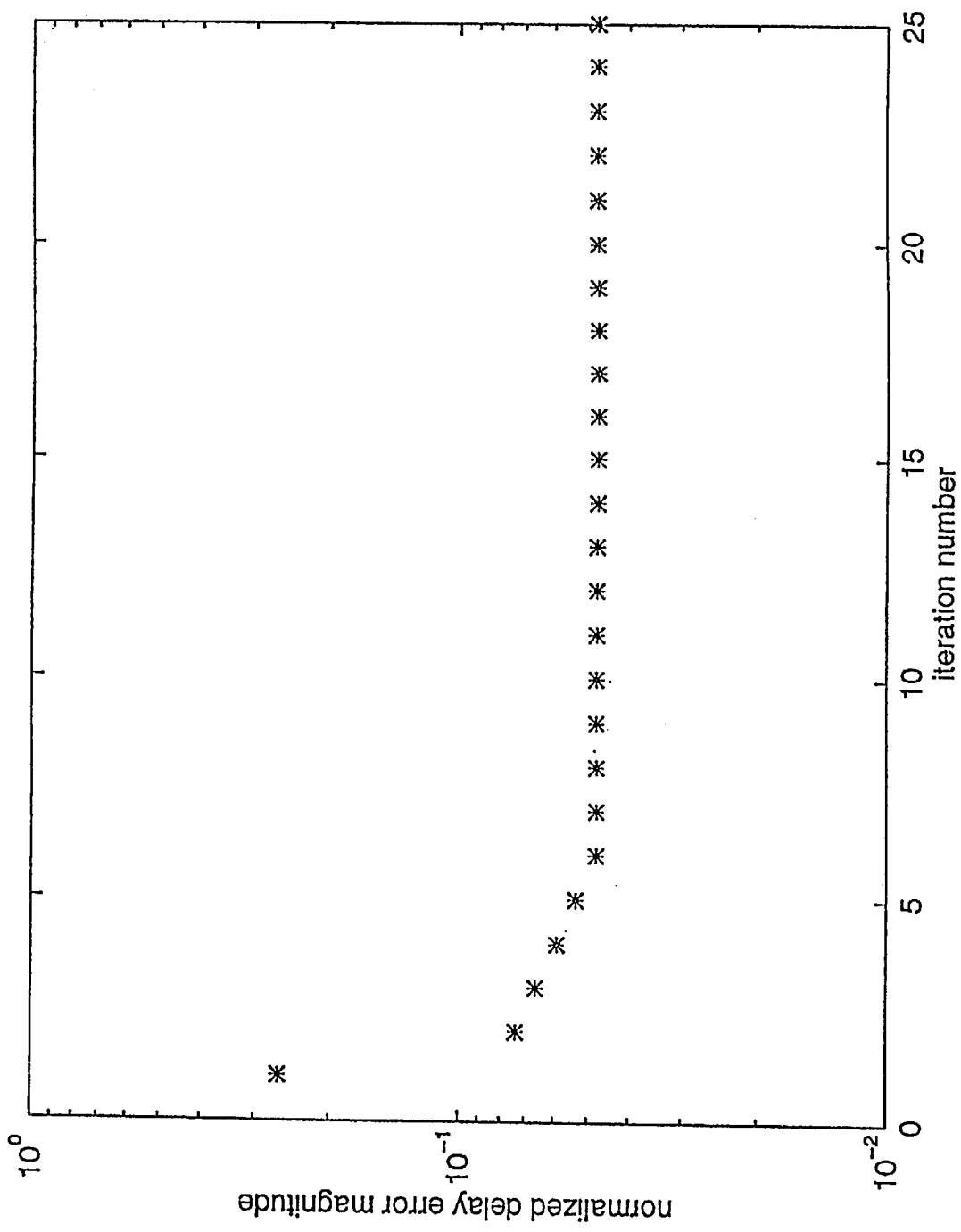
FIG. 8 is a graph of the normalized delay error magnitude vs. iterations for simulation example 2.
Figure 9:
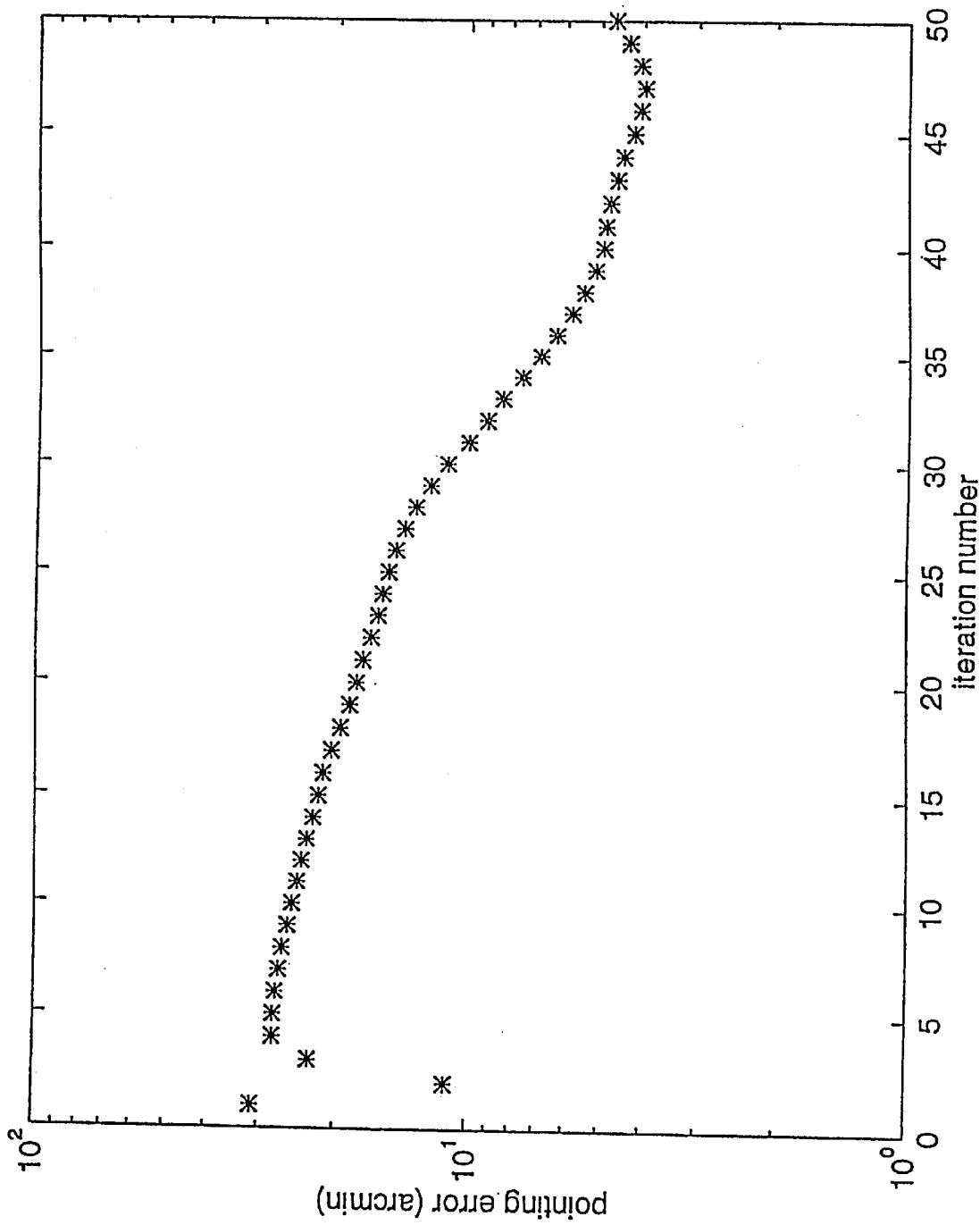
FIG. 9 is a graph of the pointing error vs. iterations for simulation example 2.

FIGS. 7 and 8 depict respectively the convergence of carrier phase and the code delay errors versus the number of samples. In this example the sample SNR is equal to 40 dB and thus corresponds to an update period of 0.1 sec for a 50 dB-Hz CNR at the GPS receiver input. Note that the multipaths with delay greater than 9 D are weak in that their relative amplitudes are less than 0.1 of the direct path which makes the identification of these multipaths more difficult. As may be inferred from these figures a residual pointing error of less than 1 arcmin and a normalized delay error of 0.005 chips is obtained in less than 50 iterations. Since the amplitudes of multipaths for delays exceeding 9 D are relatively small, one may consider ignoring these and thus select a filter order that is much smaller than q. FIG. 9 shows the resulting error performance when the filter order $K_1$ is selected to be 10. As is apparent from the figure the residual error, while much smaller compared to the initial error of about 30 arcmin, is much higher than that achieved with $K_1$=35 filter case.

Example 3

$q_1 0$; $q_2$=35; $K_1$=35; $K_2$=4; $\gamma$=$10^3$; $\bar{\tau}_d$=0.1
a=[1 0.8 0.5 0.3 0.9 0 0.2 0.5 0.3 0.7 0.1 0.5 0.6 0.2 0 1 0.7 0.5 0.2 0.3 0.5 0.7 1 0.4 0.8 0.3 0.7 1 0.7 0.8 0.6 1 0.5 0.3 0 0.7]
$\theta_m$=[0 0.5 0.7 −0.7 1 0.3 0.5 −0.6 1.5 1 0.8 0.2 0.1 0 1 −0.5 −0.3 0.6 0.1 0.5 −0.8 −0.5 0.9 1.2 −0.6 1 0.7 −1 −0.7 0.8 0.6 0.5 −0.8 1 0.4 −0.9]

Figure 10:
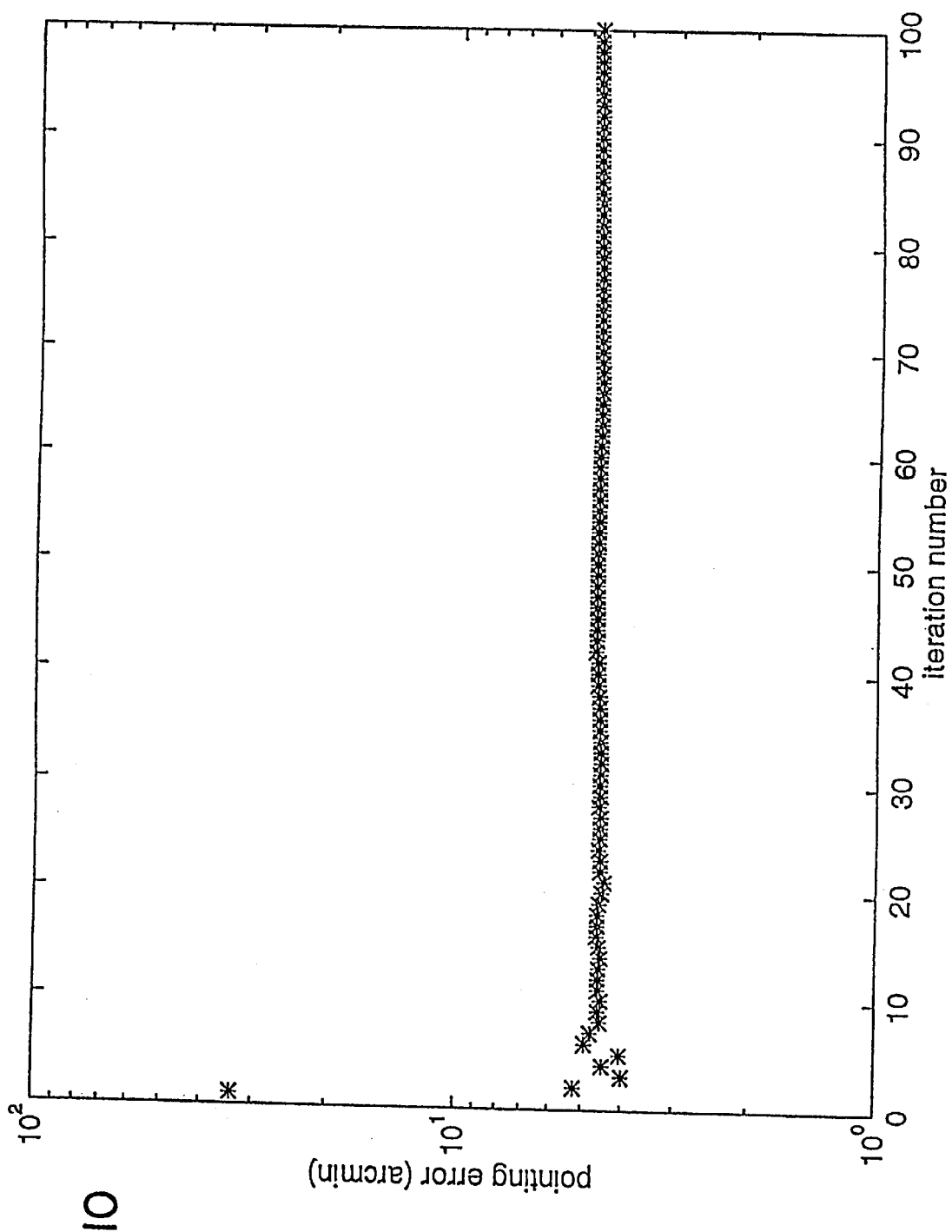
FIG. 10 is a graph of the pointing error vs. iterations for simulation example 3.
Figure 11:
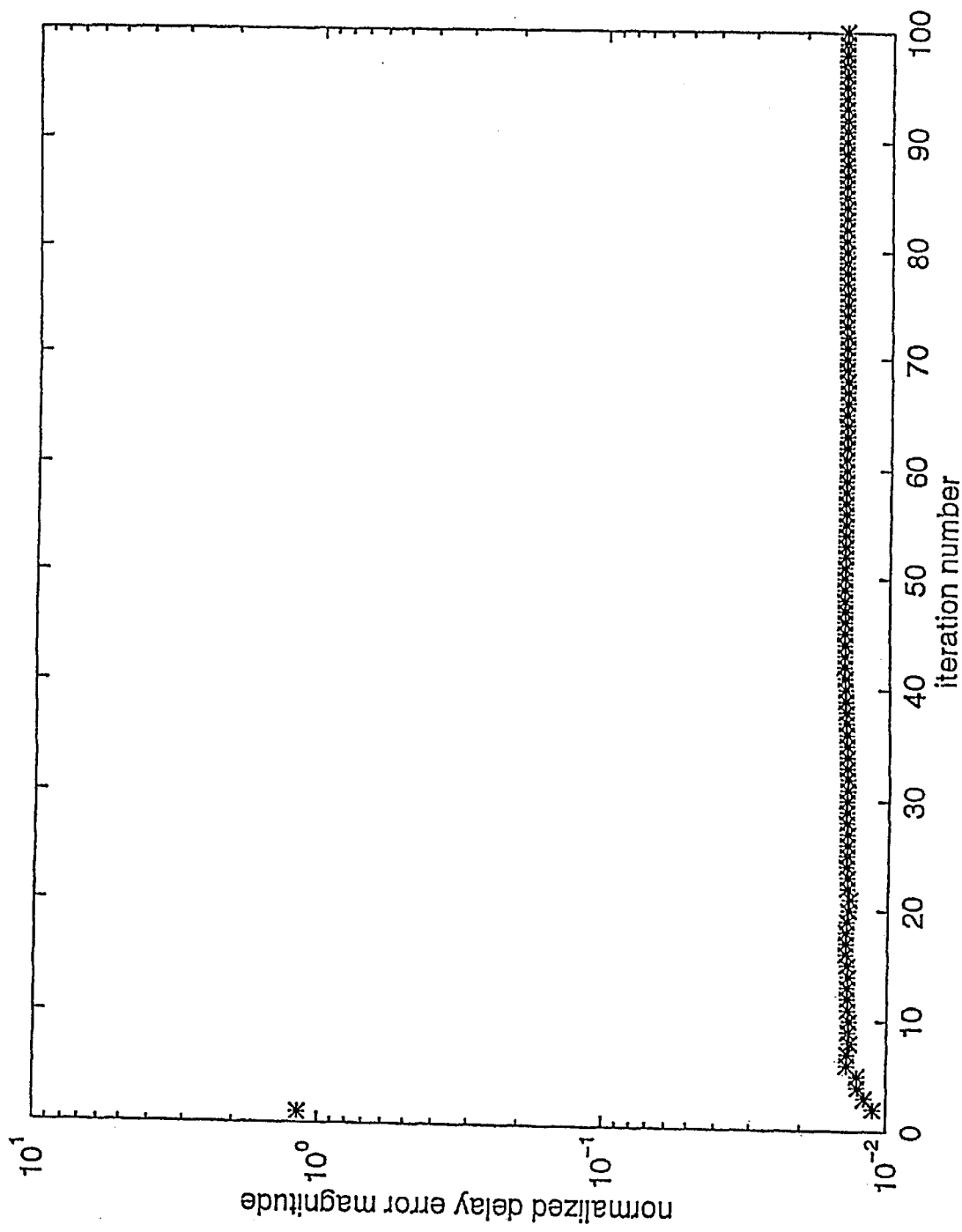
FIG. 11 is a graph of the normalized delay error vs. iteration number for simulation example 3.

FIGS. 10 and 11 plot the residual carrier phase and code delay errors respectively, for [g]=30 dB. As may be inferred from these figures, for this case of very severe multipath propagation, the pointing error is reduced from about 32 arcmin to only 4.5 arcmin while the residual delay error is about 0.01 chips.

It will be understood that the embodiment described herein are merely exemplary and that a person skilled in the art may make many variations and modifications without departing from the spirit and scope of the invention. For example, one such modification comprises sequential time sharing among a relatively small number of correlators to obtain correlation signals over a much larger range of delay offsets. This is achieved by sequentially offsetting the code NCO phase over a range of delay offsets and computing correlation signals for each such offsets instead of computing all the correlation signals in parallel as described above in the preferred embodiment. Such sequential method may be attractive if the phase and delay of the input signal vary relatively slowly with time. All such variations and modifications are intended to be included within the scope of the invention as defined in the appended claims.

We claim:

1. A method for evaluating and compensating for multipath signal error in code delay and carrier phase comprising the steps of:
   (a) receiving an input signal comprising a direct path signal and a plurality of multipath signals;
   (b) generating a first set of correlation signals by correlating the input signal with a known reference carrier signal and a plurality of reference code signals;
   (c) generating a real component of a discriminator function by subtracting pairs of said first set of correlation signals;
   (d) generating a quadrature phase reference carrier signal obtained by shifting the known reference carrier signal by ninety degrees
   (e) generating a second set of correlation signals by correlating the input signal with the quadrature phase reference carrier signal and the plurality of reference code signals;
   (f) generating an imaginary component of the discriminator function by subtracting pairs of said second set of correlation signals;
   (g) computing a carrier phase difference estimate between a phase of the known reference carrier signal and a carrier phase of the direct path component of the input signal, and also computing a code delay offset estimate between a selected reference code signal phase and a code phase of the direct path component of the input signal;
   (h) processing the carrier phase difference estimate using a carrier loop filter, and updating the phase of the known reference carrier signal to minimize the carrier phase difference;
   (i) processing the code delay offset using a code loop filter, and updating the selected reference code signal to minimize the code delay offset;
   (j) repeating steps (b) through (i) in real time such that said carrier phase difference and said code delay offset are maintained at values less than predetermined limits; and
   (k) outputting a signal corresponding to an estimated direct path component of said input signal.

2. The method as recited in claim 1 further including the step of converting the received input signal from a carrier frequency to an intermediate frequency prior to generating said first set of correlation signals.

3. The method as recited in claim 1 wherein the known reference signal is generated by a numerically controlled oscillator.

4. The method as recited in claim 1 wherein the plurality of reference code signals are generated by a numerically controlled oscillator, a code generator, and a tapped delay line.

5. The method as recited in claim 1 in which step (g) further comprises the steps of:
   (g1) generating a number of sampled multipath channel impulse response estimates corresponding to a number of uniformly spaced values of delay offsets using a least squares estimation algorithm;
   (g2) selecting one of the channel impulse response estimates based on minimizing the magnitude of a square of the difference between a complex valued sample of a discriminator function, whose real and imaginary components are respectively equal to said values of said first and second set of discriminator functions and sample values generated with the delay offset among said uniformly spaced values of delay offset and a corresponding channel impulse response estimate;
   (g3) generating a vector comprising the coefficients of an optimum deconvolution filter with said channel impulse response estimate and its shifted versions;
   (g4) convolving said complex valued sampled of said discriminator function with said coefficients of the deconvolution filter to generate a sampled version of an equalized discriminator function;
   (g5) estimating the code delay offset as the value for which the real part of the equalized discriminator function is equal to zero;
   (g6) generating a fixed multipath channel impulse response estimate based on said code delay offset estimate; and
   (g7) estimating the carrier phase difference as an argument of the complex valued sample with an index equal to zero of said final multipath channel impulse response estimate.

6. A signal receiving apparatus which compensates for multipath signal error comprising:

- means for receiving an input signal comprising a direct path signal and a plurality of multipath signals, said direct path signal and said plurality of multipath signals each comprising a carrier component and modulated by a code component;
- means for processing said input signal in first and second sets of parallel correlators to generate first and second sets or correlation signals, said correlators comprising means for correlating said input signal with a reference carrier signal in the first set of correlators and with a ninety degree phase shifted signal with respect to said reference carrier signal in the second set of correlators, wherein each set of correlators correlate using delayed signals derived from a common reference code signal, said first and second set of correlators comprising at least three correlators;
- means for combining the correlation signals generated within each of said first and second set of correlators to generate values of a first and second discriminator functions, said values of the first and second discriminator function comprising real and imaginary components of a complex-valued discriminator function;
- means for generating estimates of a phase error between a phase of the reference carrier signal and a carrier phase of the direct path component of the input signal;
- means for generating estimates of a delay offset between a selected reference code signal phase and a code phase of the direct path component of said input signal;
- carrier loop filter means for compensating the phase of the reference carrier signal based on the estimate of the phase error to minimize said phase error;
- code loop filter means for compensating the phase of the reference code signal based on the estimate of the delay offset to minimize said delay offset; and
- means for generating the direct path signal component of said input signal from said phase error and said delay offset.

7. The signal receiving apparatus as recited in claim 6 further comprising:

- a carrier numerically controlled oscillator, and
- a code numerically controlled oscillator, wherein said carrier loop filter means compensates said carrier numerically controlled oscillator to recursively converge the reference carrier phase with the direct path carrier phase, and said code loop filter means compensates said code numerically controlled oscillator to recursively converge the selected reference code signal phase with the direct path code phase.

* * * * *